United States Patent [19]

Vanderveen

[11] 4,202,636
[45] May 13, 1980

[54] MIXING DEVICE WITH INTERNAL RECYCLE

[75] Inventor: John W. Vanderveen, Bartlesville, Okla.

[73] Assignee: Phillips Petroleum Company, Bartlesville, Okla.

[21] Appl. No.: 915,860

[22] Filed: Jun. 15, 1978

Related U.S. Application Data

[62] Division of Ser. No. 762,690, Jan. 26, 1977, Pat. No. 4,123,226.

[51] Int. Cl.² .............................. B01F 7/04; B01F 7/08
[52] U.S. Cl. ..................................... 366/319; 366/321; 366/322; 366/323
[58] Field of Search ................. 366/319, 321, 322, 88, 366/81, 18, 323

[56] References Cited

U.S. PATENT DOCUMENTS

| | | | |
|---|---|---|---|
| 567,509 | 9/1896 | Reitz | 366/321 |
| 900,787 | 10/1908 | Schreck | 165/94 |
| 2,626,856 | 1/1953 | Alles | 366/319 |
| 2,944,292 | 7/1960 | Norrhede | 366/319 |
| 3,309,736 | 3/1967 | Rodenacker | 366/88 |
| 3,421,740 | 1/1969 | Behrens | 366/319 |
| 4,061,316 | 12/1977 | Austin | 366/319 |
| 4,103,354 | 7/1978 | Gorbaton | 366/321 |

Primary Examiner—Robert W. Jenkins

[57] ABSTRACT

In a mixing device adapted to mix materials flowing therethrough from an inlet end to an outlet end in which there are provided agitating elements as on a rotating shaft, there is provided an internal recycling means to impel a portion of the material, flowing from the inlet end toward the outlet end, countercurrently to the main flow, i.e., toward the inlet end to effect an in situ recycle. There is disclosed a pelleting apparatus having a horizontally-disposed substantially cylindrical shell, a rotating, pin-equipped shaft, inlet and outlet means for feeding material to be pelleted and pelleting liquid into and through the device, the shaft having mounted thereon, at least over a length thereof, at least one reverse-flight or blade adapted to cause motion toward the inlet end of the device of a portion of the mass being pelleted.

6 Claims, 2 Drawing Figures

MIXING DEVICE WITH INTERNAL RECYCLE

This application is a division of my copending application having Ser. No. 762,690, filed Jan. 26, 1977, now Pat. No. 4,123,226, entitled "Method Employing A Mixing Device With Internal Recycle"

This invention relates to a mixing device with internal recycle. It also relates to a pelleting device suitable for pelleting a solid particulate mass with a pelleting fluid, e.g., the pelleting of carbon black with water.

In one of its concepts the invention provides, in a conventional pelleting device, suitable for pelleting carbon black, upon the conventional rotating shaft, which has pins or tines extending therefrom, over a portion of said shaft, a reverse-flight or blade adapted to cause motion of material being mixed and/or pelleted to flow toward the inlet end of such a device. In another of its concepts the invention provides on the conventional carbon black pelleter rotating shaft, over at least a length thereof, an auger or flight-conveyor blade mounted on the shaft to cause flow of the mass being pelleted toward the inlet end of the device, thus causing an internal recycle of a portion of the mass. In a further concept, several such flights or blades can be provided upon the shaft, i.e., with discontinuities of the blade. According to a further concept, still, the discontinuities can be achieved without there being at the discontinuity omission of blade surface, i.e., various cut-flight conveyor blades can be used.

Carbon black pelleters for pelleting flocculent carbon black with water are known. One type of pelleter comprises essentially an elongated substantially cylindrical vessel having an auger means at its inlet end adapted to mix carbon black and water fed to said inlet end, an outlet end, and intermediate the inlet and outlet ends, but usually spaced beyond the mixing auger, the shaft carrying it will also carry beaters or pins or tines to cause pelleting of the black.

It is an object of this invention to provide a mixing device with internal recycle. It is another object of this invention to provide a mixing or pelleting device in which to pellet a solid particulate material with a pelleting fluid such as water. It is a further object of this invention to provide a simplified structure for pelleting or mixing a solid particulate material with another material in a device having a single rotating shaft while also providing for internal recycle or countercurrent movement of at least a portion of the mass being mixed as it flows from an inlet to an outlet end.

Other aspects, concepts, objects and the several advantages of this invention are apparent from a study of this disclosure, the drawing, and the appended claims.

According to the invention there is provided a mixing device comprising a vessel and a rotating shaft therein, pins or tines mounted to depend from said shaft and adapted to be moved upon rotation of said shaft, and means in combination with said shaft for impelling material in said mixture in a direction opposite to the normal flow from the inlet to the outlet end of said vessel.

More specifically, according to the invention, there is provided in a carbon black pelleter a reverse-pitch flight or blade upon the pelleter shaft to cause internal or in situ recycle of a portion of the carbon black being pelleted.

Figure 1:
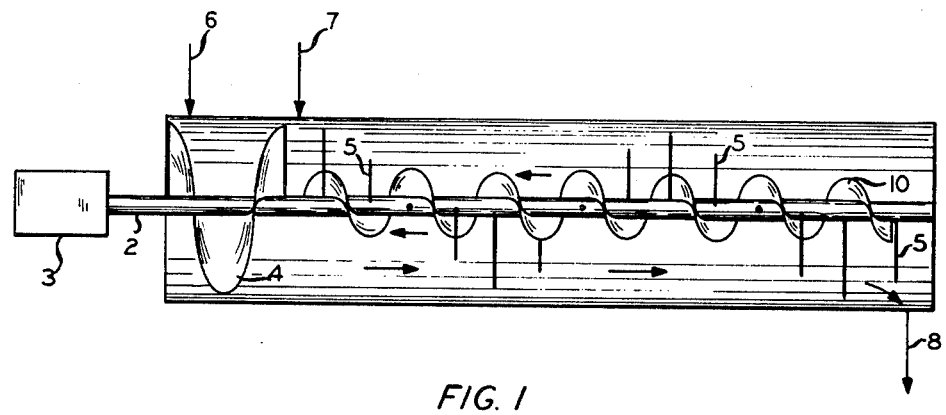
FIG. 1 shows schematically a side view of a conventional carbon black pelleter equipped with the reverse-pitch blade or conveyor of the invention.

Referring now to FIG. 1, there is provided in vessel 1 the rotating shaft 2 to be driven by motor 3. Upon the shaft there is a feed auger 4. The shaft is provided with at least one set of pins, 5, disposed helically about the shaft. Flocculent carbon black is fed by 6 and pelleting liquid is passed by 7 into the section containing feed auger 4 wherein the black and liquid are preliminarily mixed. This mixture passes through the device ultimately to be removed therefrom at 8 as wet pellets to be dried. The description thus far is of a conventional device. Accordingly, more detail is not needed.

According to the invention there is provided upon shaft 2 a flight 10 pitched to cause motion of a portion of the vessel contents from the outlet end toward the inlet end of the pelleter as shown in the figures of the drawings.

Depending upon the speed of rotation and the depth of material in the pelleter, in operation, at least a portion of the mass therein will be conveyed from right to left of FIG. 1, causing in situ or internal recycle for further mixing and pelleting.

Figure 2:
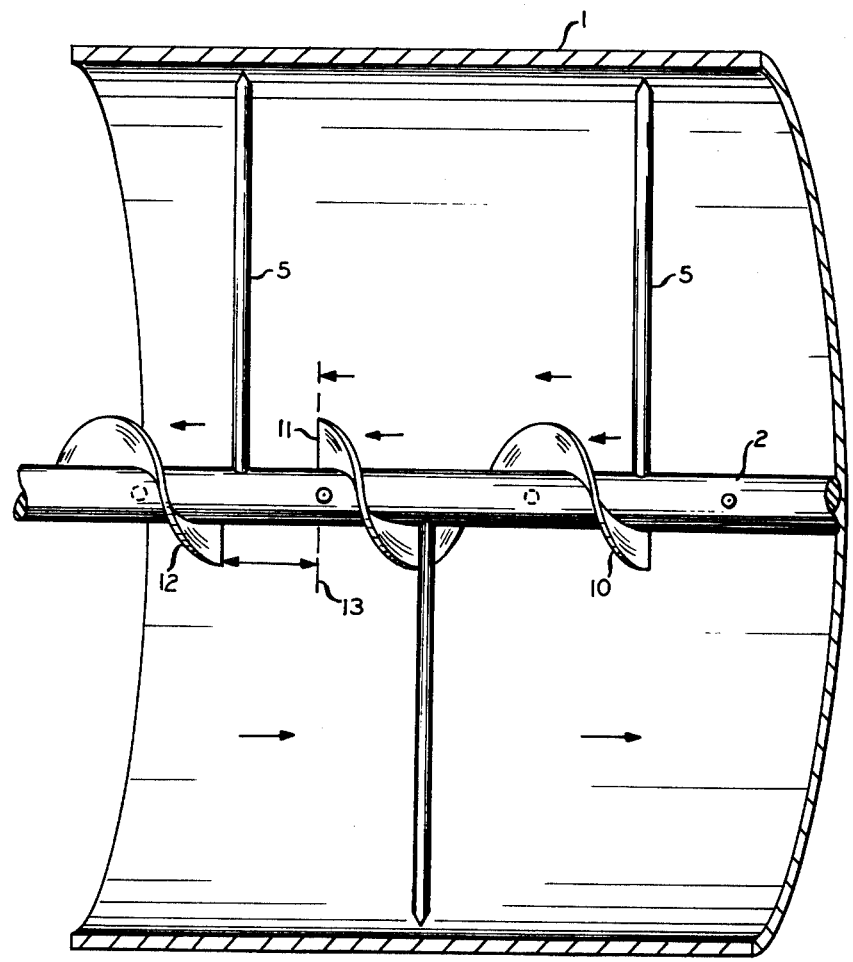
FIG. 2 is a more detailed drawing showing upon a portion of a shaft of a carbon black pelleter, equipped with pins, two segments of flight or blades according to the invention.

Referring now to FIG. 2, flight 10 is discontinuous ending at 11. Another segment, flight 12, is mounted on the shaft as shown. As shown, a segment of the flight has been removed and accordingly, there is a distance equal to the double arrow headed line along the shaft which is not provided with flight blade. However, according to the invention, this distance can be eliminated by simply moving Section 12 to the right any desired distance either near to, or to, or even beyond dotted, vertical line 13.

As shown in the figures of the drawings, indicated by the arrows, there are effected flows of the vessel contents from right to left, caused by the smaller diameter flight 10, (flights 10 and 12 in FIG. 2) and from left to right caused by the auger 4, which substantially reaches to the bottom of the vessel. Thus, the overall movement of the vessel contents is from left to right and from the vessel and is caused by auger 4. All the while the motion toward the right is taking place, the smaller diameter flight 10 (10 and 12 in FIG. 2) causes motion of the portion of the vessel contents toward the left or feed end of the vessel, as indicated by the arrows within the diameter of the smaller flight 10.

It can be seen by one skilled in the art in possession of this disclosure, having studied the same, that rotation speeds in the range of from about 250 to 500 RPM can be employed and that there will be vigorous motion of a portion of the mass being pelleted or mixed in a direction from the end portion of the device toward the inlet portion thereof. Clearly, in view of the centrifugal force involved, the material in the device will be thrown outwardly from the shaft while at the same time it is being moved toward the inlet end of the device. Material thrown toward the periphery of the device or vessel will fall or tend to fall to the bottom and will find its way into a more dense portion of material in the vessel. It will be taken at least from the bottom portion of the vessel at least from the surface of the mass in the bottom of the vessel and conveyed toward the inlet end causing the unique motion of mixing while the overall mass is moving from the inlet to the outlet end. This unique motion can be referred to as a combination mixing and rollover motion.

Reasonable variation and modification are possible within the scope of the foregoing disclosure, the drawing, and the appended claims to the invention the essence of which is that there has been provided an apparatus for pelleting carbon black which accomplishes internally a recycle as it were of material being mixed as with a pelleting fluid by providing on a mixing device conveyor shaft a reverse-flow engendering or conveying means, e.g., a reverse-flight or blade adapted to cause motion of material being mixed and/or pelleted to flow toward the inlet end of the device.

I claim:

1. A mixing device comprising a vessel, a rotatable shaft therein, pins or tines mounted to depend from said shaft and adapted to be moved upon rotation of said shaft and means in combination with said shaft comprising an auger substantially of a size to force material in said vessel from an inlet end to an outlet end thereof, and a substantially smaller diameter flight blade having a reverse-pitch for impelling material in said mixture in a direction opposite to the normal flow from said inlet to said outlet end thereof.

2. A device according to claim 1 adapted to pellet flocculent carbon black which comprises mounted on said shaft over a substantial length thereof at least one flight or blade for impelling said material in said direction.

3. A device according to claim 2 wherein several flights are mounted serially upon said shaft.

4. A device according to claim 2 wherein at least two flights or blade segments are mounted on said shaft spaced from each other.

5. A device according to claim 4 wherein the segments are axially spaced.

6. A device according to claim 4 wherein the segments are circumferentially spaced.

* * * * *